United States Patent
Engelen (10) Patent No.: US 10,893,244 B2
(45) Date of Patent: *Jan. 12, 2021

(54) COMPENSATING FOR VIGNETTING

(71) Applicant: Lumileds LLC, San Jose, CA (US)

(72) Inventor: Rob Jacques Paul Engelen, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,482

(22) Filed: Jan. 13, 2020

(65) Prior Publication Data

US 2020/0154082 A1  May 14, 2020

Related U.S. Application Data (63) Continuation of application No. 15/851,240, filed on Dec. 21, 2017, now Pat. No. 10,582,169.

(30) Foreign Application Priority Data

Apr. 28, 2017 (EP) .................................. 17168779

(51) Int. Cl.
*H04N 9/04* (2006.01)
*H04N 5/345* (2011.01)
(Continued)

(52) U.S. Cl.
CPC ......... *H04N 9/04511* (2018.08); *H04N 5/217* (2013.01); *H04N 5/2256* (2013.01);
(Continued)

(58) Field of Classification Search
CPC .. H04N 9/045; H04N 9/04511; H04N 5/3452; H04N 5/3537; H04N 5/347;
(Continued)

(56) References Cited

U.S. PATENT DOCUMENTS

| 8,729,571 B2 | 5/2014 | Daschner et al. |
| 9,323,071 B2 * | 4/2016 | Patil ........................ G02B 27/48 |

(Continued)

FOREIGN PATENT DOCUMENTS

| CN | 101803392 A | 8/2010 |
| CN | 110383803 A | 10/2019 |

(Continued)

OTHER PUBLICATIONS

"Chinese Application Serial No. 201780087293.3, Office Action dated May 21, 2020", (w/ English Translation), 16 pgs.

(Continued)

*Primary Examiner* — Pritham D Prabhakher
(74) *Attorney, Agent, or Firm* — Schwegman Lundberg & Woessner, P.A.

(57) ABSTRACT

A system including an image capture system with a sensing efficiency that varies over a field of view of the image capture system may employ shaped illumination to compensate for the variation in the sensing efficiency. An illuminator may be configured to illuminate the field of view of the image capture system with illumination shaped to have higher intensity where the sensing efficiency is lower, e.g., at the periphery of the field over view. The imaging system may thus provide image data with more uniform signal-to-noise ratios. Image data from an illuminated scene may be manipulated using data from a non-illuminated scene to produce improved image data.

20 Claims, 5 Drawing Sheets

Related U.S. Application Data (60) Provisional application No. 62/438,956, filed on Dec. 23, 2016.

(51) Int. Cl.

| | | |
|---|---|---|
| *H04N 5/353* | (2011.01) | |
| *H04N 5/347* | (2011.01) | |
| *H04N 5/217* | (2011.01) | |
| *H04N 5/225* | (2006.01) | |
| *H04N 5/357* | (2011.01) | |
| *H04N 5/235* | (2006.01) | |

(52) U.S. Cl.
CPC ........... *H04N 5/2354* (2013.01); *H04N 5/347* (2013.01); *H04N 5/3452* (2013.01); *H04N 5/3537* (2013.01); *H04N 5/3572* (2013.01); *H04N 9/045* (2013.01)

(58) Field of Classification Search
CPC .... H04N 5/3458; H04N 5/2354; H04N 5/217; H04N 5/2256; H04N 5/3572; G03B 15/05; G03B 2215/0503; G03B 2215/0567
USPC ........................................................ 348/249
See application file for complete search history.

(56) References Cited

U.S. PATENT DOCUMENTS

| | | | |
|---|---|---|---|
| 9,432,647 B2 | 8/2016 | Tajbakhsh et al. | |
| 9,442,346 B2* | 9/2016 | Gantz | H04N 5/232939 |
| 9,571,745 B2 | 2/2017 | Mahowald | |
| 9,681,058 B2 | 6/2017 | Wang et al. | |
| 9,684,840 B2 | 6/2017 | Huang et al. | |
| 9,699,428 B2* | 7/2017 | Bai | H04N 1/60 |
| 9,706,098 B2* | 7/2017 | Weng | H04N 5/2256 |
| 9,841,563 B2* | 12/2017 | Lapstun | G02B 27/0093 |
| 9,852,519 B2 | 12/2017 | Wu et al. | |
| 9,860,522 B2 | 1/2018 | Lapstun | |
| 9,961,245 B1 | 5/2018 | Rowles et al. | |
| 9,978,147 B2* | 5/2018 | Raniwala | H04N 13/246 |
| 9,983,149 B2* | 5/2018 | Rudolf | G01B 11/2441 |
| 10,306,132 B2 | 5/2019 | Nobayashi | |
| 10,356,334 B2* | 7/2019 | Moore | H04N 5/2252 |
| 10,440,355 B2* | 10/2019 | Trail | G06T 19/006 |
| 10,582,169 B2 | 3/2020 | Engelen | |
| 2007/0153495 A1 | 7/2007 | Wang et al. | |
| 2008/0106636 A1 | 5/2008 | Wernersson | |
| 2010/0020227 A1 | 1/2010 | Robinson et al. | |
| 2012/0262571 A1* | 10/2012 | Wang | H04N 5/2256 348/135 |
| 2013/0069084 A1* | 3/2013 | Daschner | G03B 15/03 257/88 |
| 2014/0055978 A1* | 2/2014 | Gantz | H04N 5/232411 362/8 |
| 2014/0118556 A1 | 5/2014 | Huang et al. | |
| 2014/0375821 A1 | 12/2014 | Wu et al. | |
| 2015/0070537 A1 | 3/2015 | Bai et al. | |
| 2015/0070570 A1 | 3/2015 | Tajbakhsh et al. | |
| 2015/0078001 A1 | 3/2015 | Patil et al. | |
| 2015/0116586 A1 | 4/2015 | Mahowald | |
| 2016/0139402 A1 | 5/2016 | Lapstun | |
| 2016/0142610 A1* | 5/2016 | Rivard | H04N 5/232933 348/239 |
| 2016/0165110 A1 | 6/2016 | Weng et al. | |
| 2016/0187264 A1 | 6/2016 | Rudolf | |
| 2017/0115395 A1 | 4/2017 | Grauer et al. | |
| 2017/0115480 A1* | 4/2017 | Wada | G03B 15/02 |
| 2017/0134717 A1 | 5/2017 | Trail et al. | |
| 2017/0142314 A1 | 5/2017 | Moore et al. | |
| 2017/0186146 A1 | 6/2017 | Raniwala et al. | |
| 2017/0214907 A1 | 7/2017 | Lapstun | |
| 2018/0184053 A1 | 6/2018 | Engelen | |
| 2018/0359424 A1* | 12/2018 | Shibusawa | H04N 5/23218 |

FOREIGN PATENT DOCUMENTS

| | | |
|---|---|---|
| EP | 1233606 A2 | 8/2002 |
| EP | 1233606 A3 | 3/2004 |
| TW | 201830341 A | 8/2018 |
| WO | WO-2007078961 A2 | 7/2007 |
| WO | WO-2009/034521 A1 | 3/2009 |
| WO | WO-2014/087301 A1 | 6/2014 |
| WO | WO-2016/105698 A1 | 6/2016 |
| WO | WO-2018/119345 A1 | 6/2018 |

OTHER PUBLICATIONS

U.S. Appl. No. 15/851,240, filed Dec. 21, 2017, Compensating for Vignetting.

"U.S. Appl. No. 15/851,240, Non-Final Office Action dated Jun. 24, 2019", 23 pgs.

"U.S. Appl. No. 15/851,240, Notice of Allowance dated Oct. 15, 2019", 11 pgs.

"U.S. Appl. No. 15/851,240, Response filed Mar. 25, 2019 to Restriction Requirement dated Jan. 24, 2019", 7 pgs.

"U.S. Appl. No. 15/851,240, Response filed Sep. 24, 2019 to Non-Final Office Action dated Jun. 24, 2019", 10 pgs.

"U.S. Appl. No. 15/851,240, Restriction Requirement dated Jan. 24, 2019", 7 pgs.

"International Application Serial No. PCT/US2017/068087, International Preliminary Report on Patentability dated Jul. 4, 2019", 10 pgs.

"International Application Serial No. PCT/US2017/068087, International Search Report dated Mar. 21, 2018", 4 pgs.

"International Application Serial No. PCT/US2017/068087, Written Opinion dated Mar. 21, 2018", 8 pgs.

"Japanese Application Serial No. 2019-534379, Voluntary Amendment filed Aug. 23, 2019", (w/ English Claims), 5 pgs.

* cited by examiner

COMPENSATING FOR VIGNETTING

CROSS REFERENCE TO RELATED APPLICATIONS

This application claims the benefit of U.S. Provisional Patent Application No. 62/438,956 filed on Dec. 23, 2016, which is incorporated by reference as if fully set forth herein.

BACKGROUND

Vignetting, in photography or imaging is an effect where a portion, such as the periphery, of an image is darker or less saturate than another part of the image. Vignetting may be intentional or desired in some photography to achieve a desire image effect or aesthetic. In other cases, unintentional and undesirable vignetting results from a camera's limitations or improper settings. Digital image correction can reduce or eliminate undesired vignetting, but while digital image processing may improve the appearance of an image, digital processing may not improve the accuracy of image data. As a result, in some applications, such as a time-of-flight cameras or machine vision imaging, image post-processing can be ineffective because the additional processing does not improve and may worsen the signal-to-noise ratios (SNRs) of the image data.

SUMMARY

In accordance with an aspect of the invention, a scene or object may be illuminated to compensate for the vignetting that would otherwise result in an imaging system. As an example, illumination in areas corresponding to the corners of the field-of-view of the imaging system may be more intense than the illumination in areas corresponding to the center of the field-of-view. Further, imaging systems may use illuminators that provide illumination specifically shaped according to the capabilities of the image capture systems. Some systems may manipulate image data based on two or more versions of image data collected for a scene such as by removing data from a first version based on image data from a second version. Some systems may employ image capture techniques that are only sensitive to the emitted light from the illuminator for the system, so that the effects of uncontrolled ambient lighting can be avoided. Some of these imaging systems may be particularly suited for 3D cameras, gesture control cameras, or camera systems used in dark settings.

In accordance with an implementation, an imaging system includes an image capture system and an illuminator. The image capture system has a sensing efficiency that varies over a field of view of the image capture system, and the illuminator illuminates the field of view of the image capture system with illumination having a distribution shaped to have higher intensity where the sensing efficiency is lower.

In accordance with another implementation, a method for collecting image data includes illuminating a scene with illumination having a shaped distribution with higher intensity where sensing efficiency of an image capture system is lower. The image capture system may then capture image data representing the scene as illuminated with the illumination having the shaped distribution. The image data may have a substantially uniform signal-to-noise ratio or may be used to generate image data having a substantially uniform signal-to-noise ratio.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION OF THE PREFERRED EMBODIMENTS

According to embodiments described herein, an imaging system may employ an illuminator configured to provide illumination shaped to reduce or avoid vignetting or other variations in images and/or to provide image data with more uniform signal-to-noise ratios (SNRs) especially in comparison to traditional image data which may correct vignetting during a post-processing stage, resulting in non-uniform and/or higher SNRs. The illuminator may particularly be adapted to provide illumination having an intensity distribution with a shape specifically based on the characteristics of an image capture system, e.g., the capabilities of the imaging optics and the sensing array. The illuminator may provide a fixed shape for the illumination, e.g., a shape that results from illuminator hardware, lenses, and light sources, or provide illumination that may be programmed or changed, for example, according to current ambient lighting conditions or current setting of the image capture system. In some implementations, the imaging system may include an illuminator and image capture system that are matched so that illumination compensates for non-uniform sensing efficiency of the image capture system and so that the image capture system is only sensitive to the illumination from the illuminator.

Figure 1:
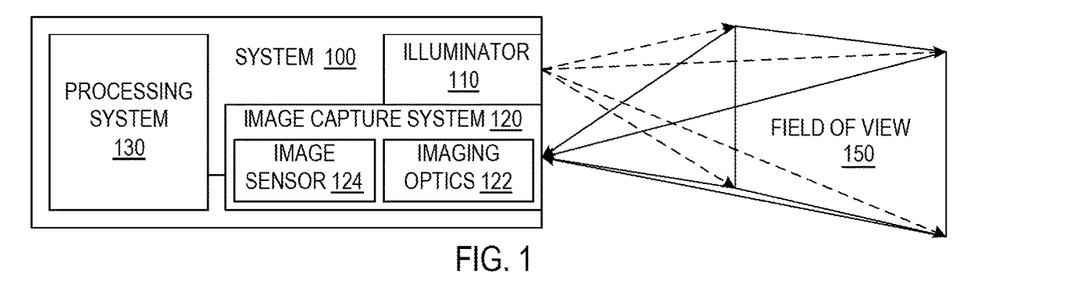
FIG. 1 shows a block diagram of a system including an illuminator that provides illumination shaped to reduce or avoid the effects of vignetting on image data.

FIG. 1 is a block diagram of a system 100 in accordance with one implementation of the invention. System 100 may be any type of device or collection of devices that capture(s) image data. For example, system 100 may be a camera such as a security camera, a 3D camera, a depth sensing camera, a night vision camera, or a biometric identification camera, or biometric sensing camera, and may be a or may be part of a multi-function device such as a mobile telephone, a computer, a robot, an industrial system, or a vehicle that has or employs imaging capabilities, or may be any type of system that requires data representing or capturing a scene within a field of view. System 100 may particularly be or include a system that processes image data and, as described further below, may be able to capture or produce image data having SNRs across different areas of an image. It should be understood that although a system is used to describe this implementation, the system may be a single device or a combination of devices, as disclosed herein.

System 100, as illustrated, includes an illuminator 110, an image capture system 120, and a processing system 130 that operate to capture images or image data from a field of view 150. Imaging system 100 (or particularly the separation between illuminator 110 and image capture system 120) may be small relative to the object or scene within field of view 150, so that the optical axes of illuminator 110 and image capture system 120 may be approximately co-linear with each other.

Illuminator 110 may be a lighting system capable of providing illumination covering at least a portion of an object or a scene that is within field of view 150 of image capture system 120. Illuminator 110 may include one or more light sources such as light emitting diodes (LEDs) or semiconductor lasers and optics that are together configured to provide flashes or bursts of illumination or continuous illumination that is shaped, e.g., has an intensity profile that varies and particularly that varies with the angle of light rays from illuminator 110 relative to the optical axis of illuminator 110. Some examples of implementations of suitable illuminators are described herein and illuminator 110 is used herein as a general reference to an illuminator which may apply to one or more suitable illuminators.

Image capture system 120 may be a camera capable of capturing still images or sequences of images, e.g., video. Image capture system 120 may be of any design including those well known in the art for cameras. In the general configuration illustrated in FIG. 1, image capture system 120 includes imaging optics 122 and an image sensor 124. Imaging optics 122, in a typical configuration, may include, for example, one or more lenses, focusing systems, and aperture control systems that operate to form an image on image sensor 124. Image sensor 124, which may, for example, be a charge coupled device (CCD) or a CMOS sensor array, senses light from the image formed by imaging optics 122 and provides image data to processing system 130. The image data may, for example, include one or more arrays pixel values with each pixel value representing an intensity, color, shadow, reflection, or spectral content that a pixel sensor sensed for a corresponding area or angular range in field of view 150.

Processing system 130 may provide general control of imaging capture system 120, for example, to set parameters for image capture or to initiate image capture, and processing system 130 may include a conventional microcontroller with suitable software or firmware for those functions. Processing system 130 may particularly set or detect settings or characteristics of image capture system that control the boundaries of field of view 150 and the efficiency at which pixel sensors in image sensor 124 senses light from respective areas of field of view 150. Processing system 130 may further control illuminator 110 to provide the correct illumination for the current configuration of image capture system 120, e.g., the focus or magnification of image capture system 120, or for ambient lighting that may be present during image capture. Processing system 130 may further process image data from image capture system 120, for example, to simply store image data in data storage (not shown) or to perform a function such as recognizing objects, extracting depth information, doing color corrections, or performing spectral analysis and so on. Processing system 130 may further process the manipulation of image data based on two or more captured image data, such as by subtracting a first image data from a second image data, as further disclosed herein.

Figure 2A:
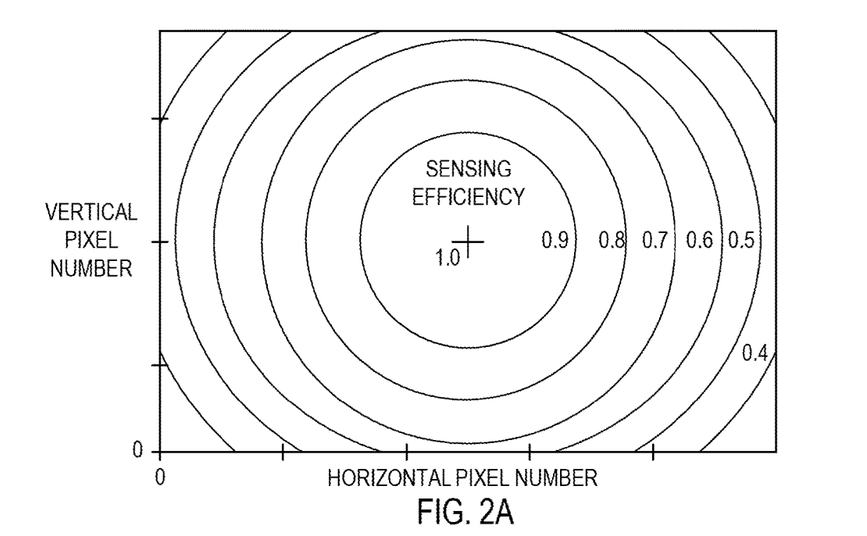
FIG. 2A shows a contour plot illustrating how the sensing efficiency in an image capture system may decline toward edges of a field of view of the image capture system.

The configuration of imaging optics 122 and the size and configuration of image sensor 124 may determine or define the boundaries of field of view 150. In many configurations, however, image capture system 120 may be unable to provide uniform sensitivity or uniform sensing efficiency for the entirety of field of view 150. For example, the sizes of apertures in imaging optics 122 may make image capture system 120 less able to collect light from the periphery of field of view 150, which results in vignetting. FIG. 2A illustrates an example of sensing efficiency of an example image capture system. The sensing efficiency of a pixel sensor in an imaging system may be defined as or determined from a ratio of the intensity sensed by the pixel sensor to the intensity of light originating from the region or angular range in a field of view corresponding to the pixel. Such sensing efficiency may be exemplified for an ideal image capture system by considering a uniform field, e.g., a white screen that is uniformly lit and sensed, by the sensory array in the image capture system, as uniformly lit. In this case, a sensor array in the image capture system would ideally measure uniform intensity across the area of the sensor array. In real image capture systems, different pixel sensors in the image sensor may measure different intensities, e.g., because of limits in the ability of the image capture system to collect light from different areas in the field of view. As shown in FIG. 2A, a typical image capture system subject to vignetting may have a highest sensing efficiency at the center of the field of view of the image capture system, which may be because the system is able to capture a larger fraction of the light originating at the center of the field of view. FIG. 2A shows the center of the field of view with peak sensing efficiency (assigned a relative value 1.0). The contours in FIG. 2A show how the sensing sensitivity falls for pixel sensors positioned nearer to the edges of the image sensor, which would result in vignetting of images and higher signal-to-noise ratios in pixel data associated pixels near the edges of the field of view. With an imaging capture system having sensing efficiency as shown in the example of FIG. 2A, an image of a uniformly lit scene would have the measured intensity levels at the corners of the field of view that are about 40% of what an ideal imaging system would measure.

The lower measured intensity levels, such as those shown towards the corners in the example of FIG. 2A, may cause the signal-to-noise ratio worsen as the signal-to-noise ratio often depends on the measured intensity levels. Here, lower intensity levels may correspond to a higher signal-to-noise ratio at the corners of the field of view in FIG. 2A. Applying post-processing techniques in an attempt to improve an image quality at the corners of the field of view may cause an even higher (worse) signal-to-noise ratio. This may be especially problematic in certain imaging systems such as security cameras, time of flight cameras, depth sensing cameras, 3D imagers, night vision cameras, and the like.

Figure 2B:
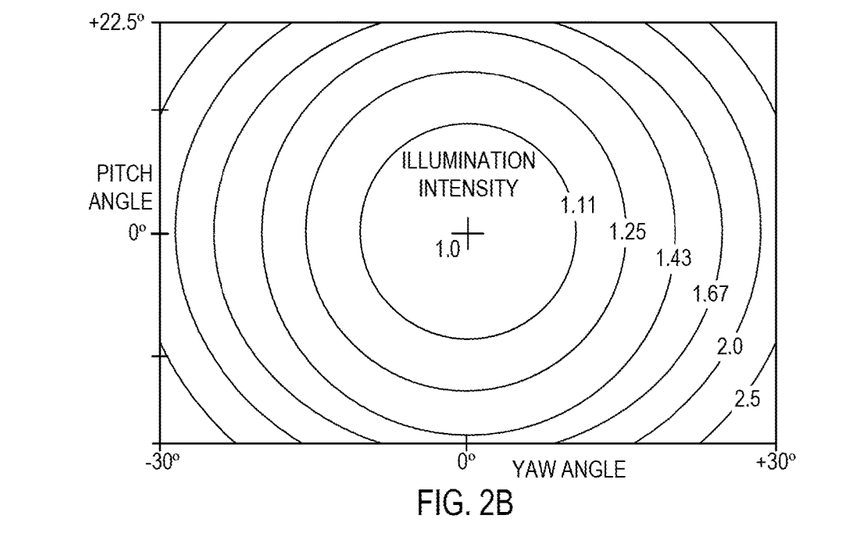
FIG. 2B shows a contour plot illustrating angular dependence of illumination shaped to compensate for the sensing efficiency variations illustrated in FIG. 2A.

Illuminator 110 may provide illumination having an intensity distribution that is shaped to compensate for vignetting or other variations in sensing sensitivity. In particular, the illumination may have a pattern shaped in angular space. FIG. 2B shows a contour plot illustrating an intensity distribution, according to an implementation of the disclosed subject matter, that compensates for the non-uniform sensing efficiency illustrated in FIG. 2A. The illumination intensity within the field of view shown in FIG. 2B may be inversely proportional to the corresponding sensing efficiency within the field of view shown in FIG. 2A. The illumination in FIG. 2B is plotted as a function of angle relative to a ray from the illuminator 110 to the center of the field of view of the illuminator 110. Corresponding pixel sensors in an image capture system may detect light from respective angles for light from a scene within the field of view of the image capture system. FIG. 2B does not show illumination that would illuminate areas outside the field of view of the imaging system. No illumination is needed for imaging outside the field of view the imaging system, so the illuminator intensity from the illuminator 110 is not critical and may be zero outside the ranges of field-of-view angles.

The illumination provided by an illuminator 110 is represented in FIG. 2B and has a lowest illuminated intensity (assigned a relative intensity factor of 1.0) at a center of the field of view. The illumination increases in intensity toward the edges of the field of view. For example, at the corners of the field of view, the illumination has a relative intensity of 2.5, which is 250% of the illumination at the center of the field of view. An imaging system using such illumination may achieve uniform effective sensing efficiency across the sensing array if the increase in illumination intensity compensates for the decrease in sensing efficiency for image capture. In the illustrated example, for each pixel sensor, the product of the relative sensitivity factor from FIG. 2A and the corresponding relative intensity factor from FIG. 2B is uniform. At the center, the product of relative capture factor 1.0 and relative illumination factor 1.0 is 1, and at the corners the product of relative capture factor 0.4 and relative illumination factor 2.5 is also 1.

The illumination illustrated in FIG. 2A may fully or substantially fully compensate for vignetting or for variations in SNR caused in an image or in image data by the variable sensing efficiency illustrated in FIG. 2A. According to an implementation of the disclosed subject matter, the image capture system may only capture reflected light for which the illuminator 110 is the original source. This may be achieved, at least approximately, through use of an image capture system that is sensitive only to the light having the characteristics, e.g., the polarization, frequency, or wavelength of light from the illuminator 110. For example, the illuminator 110 may produce illumination in a narrow spectral band, and the image capture system may include a spectral filter tuned to the illumination band and allowing mostly light from the illuminator 110 to pass. Further, the illuminator 110 may be turned off and on for capture images of a scene in "dark" and "bright" illuminations, and a processing system can subtract image data corresponding to a dark image from a bright image data to produce image data corresponding to an image that would result when the scene was only under illumination from the illuminator 110. Synchronous image detection techniques could similarly modulate light from the illuminator 110 (on and off) at frequencies and phases selected according to the frame rate or image capture timing of cameras. For example, the frequency of flashes of illumination from an illuminator 110 may be much higher than the frame rate of a camera and/or provide a phase difference relative to image capture in the camera so that time-of-flight calculations can use image data and determine distances to objects that the illuminator 110 illuminates. Variation on synchronous image detection techniques may be used in time-of-flight imaging.

The camera or image capture system may capture ambient light and light from the illuminator 110 that is reflected from objects in the field of view. According to an implementation of the disclosed subject matter, the illuminator 110 may provide illumination that is altered based on or adapted according to the ambient illumination that may be expected or measured for the field of view. For example, for a uniformly lit scene, the illuminator 110 may be operated to provide illumination that, when added to the uniform ambient light, provides the total intensities as shown in FIG. 2B and thereby compensates for the relative sensing efficiency illustrated in FIG. 2A. Commonly, the ambient light in a scene, e.g., from a conventional light source such as room lighting or conventional camera flash systems, may not be uniform and may exacerbate vignetting, and an illuminator 110 used with such ambient light may need to provide illumination that is shaped to compensate for effects caused by both limitations of the image capture system and the ambient lighting. In particular, the illuminator 110 therefore may need to compensate for illumination vignetting and imaging vignetting, requiring the illuminator 110 to produce stronger compensation than illustrated by the example of FIG. 2A and FIG. 2B.

The image capture system may capture two or more sets of image data for a given scene. The two or more sets of image data may be collected, for example, by capturing back-to-back image data. A first image data may be collected when an illuminator 110 illuminates the scene. A second image data may be captured without the illumination from the illuminator 110 and may capture image data for the scene with ambient light illuminating the scene. A processing component such as a microprocessor, a microcontroller, or any other applicable processing component may be configured to manipulate the two or more sets of image data to produce improved image data that may be used for security systems, 3D systems, depth sensing, object recognition, night vision, biometric identification and sensing, or the like. The improved image data may combine the first and second image data such that the resulting improved image data contains a uniform signal to noise ratio. Alternatively, the improved image data may be the result of subtracting the second image data captured in ambient light from the first image data captured when the illuminator 110 illuminates the scene. This improved image data my, for example, allow the processing component to collect image data in the same format that comparable data is stored in the system. The improved image data may be compared to the comparable image data for object recognition such as facial recognition. More specifically, subtracting the second image data captured under ambient light from the first image data captured under the illuminator's light may result in improved image data that may correspond to a standardized format of data. In this example, the influence of ambient light onto a scene may be removed in the improved image data such that it can be compared to other standardized image data.

Figure 3A:
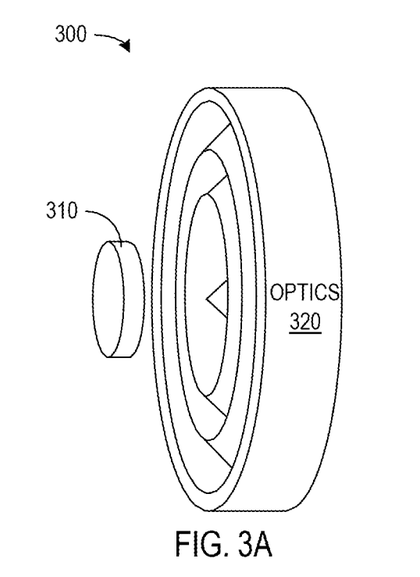
FIG. 3A shows a perspective view of an illuminator using optics to provide rotationally symmetric shaped illumination.

Illuminator 110 of FIG. 1 may be implemented using a variety of different architectures. FIG. 3A, for example, illustrates components of an illuminator 300 including a light source 310 and optics 320. Light source 310 may be any component configured to emit light such as an LED or an array of LEDs, and optics 320 may include one or more optical elements such as Fresnel lenses, gratings, or other structures that alter or control the angular distributions or shape of illumination exiting optics 320. In an assembled illuminator 300, optics 320 may be attached to light source 310.

Figure 3B:
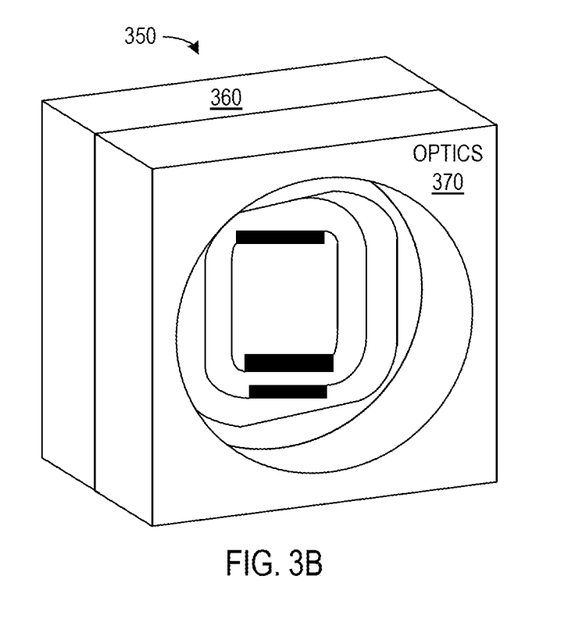
FIG. 3B shows a perspective view of an illuminator that provides shaped illumination using a shaping lens that efficiently limits illumination to a field of view of an imaging system.

Optics 320 for illuminator 300 of FIG. 3A may produce a rotationally symmetric illumination pattern and may be easier to design and fabricate, e.g., with circular optical elements. A rotationally symmetric illumination, however, may result in significant amounts of wasted light, i.e., light outside field of view, when an image capture system has a rectangular field of view. FIG. 3B shows an illuminator 350 that employs optics 370 including rectangular optical elements to more efficiently use radiation from a light source 360 to provide illumination to a rectangular field of view.

Figure 4:
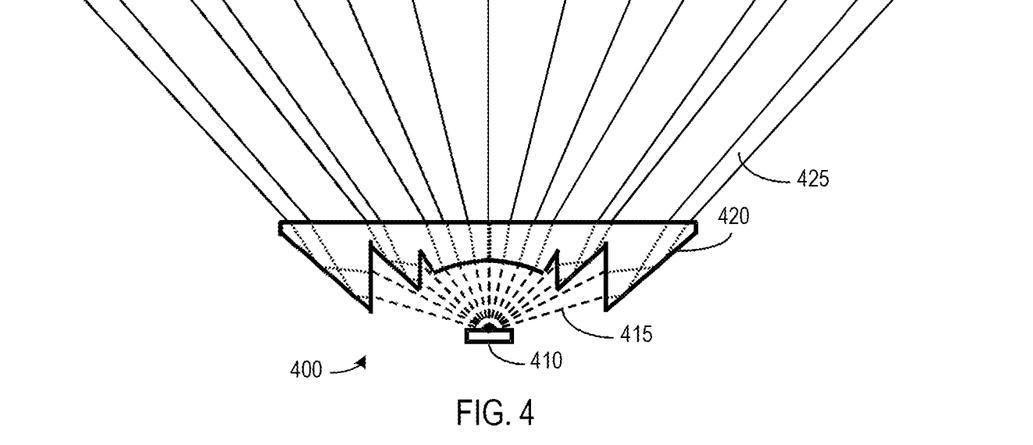
FIG. 4 shows a cross-sectional view of an illuminator that uses a source of diverging light to produce illumination with a shaped distribution.

An illuminator using an LED as a light source, e.g., light source 310 or 360, may need an optical system, e.g., optics 320 or 370, that reshapes the angular dependence of the intensity distribution of light emitted from the light source. Accordingly, the optical system may be designed according to the light emission characteristics of the light source. FIG. 4, for example, shows a cross-sectional view of an illuminator 400 including a light source 410 that may be an LED or other light emitting devices that emits light 415 that diverges from a source area. The intensity of light 415 from light source 410 depends on the construction of light source 410, and a typical light source may have an angular intensity distribution that is uniform or Lambertian, for example. As noted above, the desired angular distribution of illumination 425 from illuminator 400 may require a different distribution, e.g., a distribution that is more intense at larger angles from an optical axis of the illuminator. To increase intensity at edges of a field of view, an optical element 420 may fold the rays diverging from an LED such that the rays are more dense, i.e., brighter, in the areas or directions where more light is desired, e.g., brighter at larger angles of divergence.

The same principles illustrated in FIG. 4 for a single source 410 of divergent light may be employed and repeated for an array of such light sources. For example, in yet another alternative configuration, an illuminator 110 includes an array of LEDs and an array of optical elements to shape illumination and direct illumination from the LEDs into a rectangular field of view. U.S. Pat. No. 8,729,571, entitled "Multiple die LED and lens optical system," for example, discloses architectures for LED arrays or systems having controlled distributions of light.

Figure 5A:
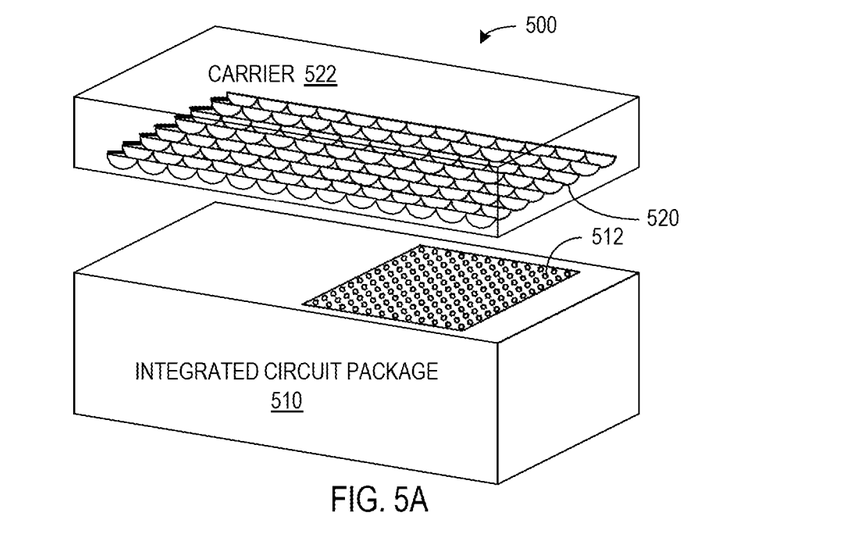
FIGS. 5A and 5B respectively show an exploded view and an assembled view of an illuminator employing an array of semiconductor lasers.
Figure 5B:
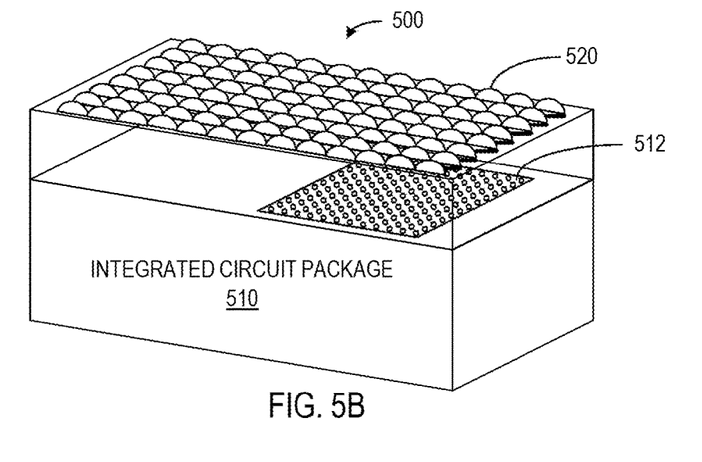

FIG. 5A, for example, illustrates components of an illuminator 500 wherein an array of semiconductor lasers with a diffuser as the primary optic is employed. Illuminator 500 includes an integrated circuit package 510 containing an array 512 of vertical cavity surface emitting lasers (VCSELs) or other semiconductor lasers. A diffuser 520 is shown in FIG. 5A on a carrier 522 that may be used during fabrication of diffuser 520 or for attachment of diffuser 520 to integrated circuit package 510 in the assembled illuminator 500 as shown in FIG. 5B. Diffuser 520 may be an engineered diffuser with carefully controlled characteristics, e.g., an array of microlenses or other optical elements with predefined shapes and positions. A single laser in array 512 may produce light with a divergence of about 20 degrees. Depending on the spacing of lasers in array 512 and the spacing of lenslets or other optical elements in diffuser 520, each laser may illuminate one or multiple lenslets or optical elements in the diffuser 520. In one configuration, diffuser 520 may separately shape light from each laser in array 512. More generally, diffuser 520 transforms the light from array 512 into a divergent beam, e.g., a rectangular angular fan, with a desired angular intensity distribution. As shown in FIG. 5B, diffuser 520 may be attached to package 510 so that diffuser 520 receives light from array 512.

The distribution of illumination from illuminator 500 may be further controlled by the electrical power or currents respectively applied to the lasers in array 512. More generally, some light emitters may be close to point sources but will have some size or extent for each light emitting area, and an optical system tends to create a distorted image of the light emitting area. Commonly, the light from the periphery of a light emitting area, e.g., edges of an LED chip, tends to illuminate the periphery of a spot or scene. The spatial distribution of light from an extended source such as array 512 thus may be set or altered to impact the angular radiation pattern the illumination out of an optic such as diffuser 520.

Figure 6:
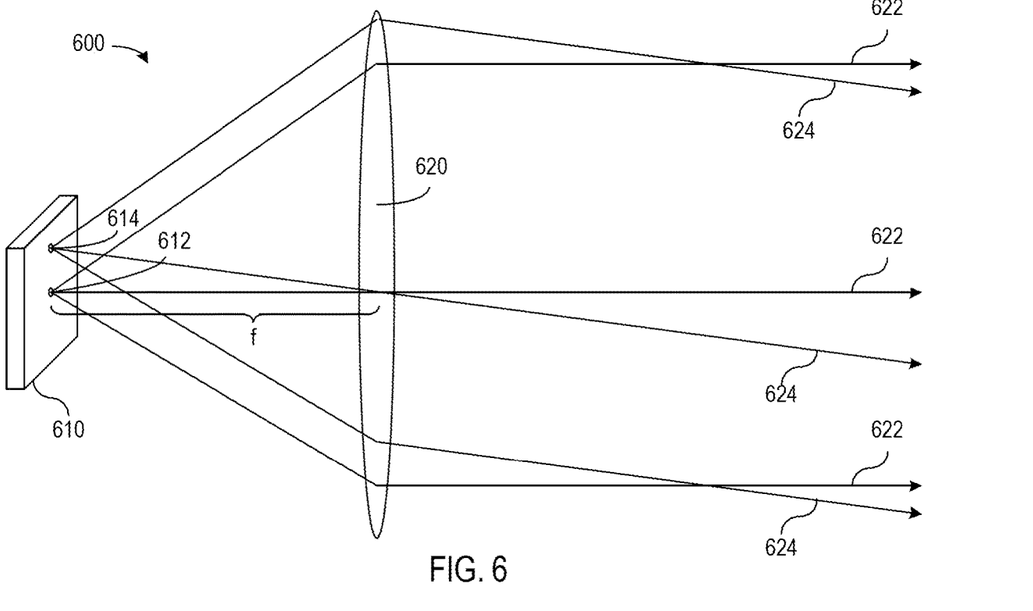
FIG. 6 shows an illuminator that uses a light source producing light with a spatially non-uniform intensity distribution to produce illumination with an angularly non-uniform intensity distribution.

According to an implementation of the disclosed subject matter, FIG. 6 shows an illuminator 600 that uses a light source 610 that is extended and spatially non-uniform to produce a desired angular distribution for intensity in output illumination. Light source 610 may be made of multiple and perhaps individually addressable individual emitters, e.g., a VCSEL array, or may be one extended source producing a spatial distribution of illumination that varies over the light emitting area of the extended source. In the illustrated configuration, light source 610 is positioned to produce light originating from a focal plane of optical system 620. FIG. 6 illustrates a particularly simple implementation where optical system 620 is a lens, but other or more complex optical systems may be employed to translate spatial positions on light source 610 to far field angles or to otherwise correlate spatial and angular distributions of light. With the illustrated configuration, optical system 620 directs or projects light from different areas of light source 610 to different the far field angles. For example, optical system 620 directs light that originated from an area 612 of light source 610 on the optical axis of optical system 620 as light 622 parallel to the optical axis, but optical system 620 directs light 624 from an off-axis area 614 of light source 610 along a direction that depends on the focal length f of optical system 620 and on the position of area 614 relative to the optical axis of optical system 620. Accordingly, the angular distribution of light from illuminator 600 is correlated with the spatial distribution of light emitted from light source 610, and brighter areas of light source 610 produce brighter angular regions in the radiation pattern of the illumination from illuminator 600. Accordingly, to produce illumination that is brighter at larger angles, light source 610 may be designed or may be operated to be brighter at its periphery.

Light source 610, in one implementation, may be a collection or an array of separately controllable or addressable light elements having intensities that may be programmed or controlled to achieve a desired shape for emitted illumination. For example, with an array of separately controllable light elements in light source 610, a control or processing system may independently operate the light elements in the array so that light source 610 produces a spatial distribution of light that results in a desired far-field illumination from illuminator 600. The illumination from the illuminator 600 may thus be tuned according to sensing efficiency of an image capture system and may be altered if necessary as the image capture system changes due to aging or altered settings. In one implementation, a processing system may execute software that changes the illumination from light source 610 according to changes in the focus, magnification, or another characteristic of an image capture system being used with illuminator 600.

Figure 7:
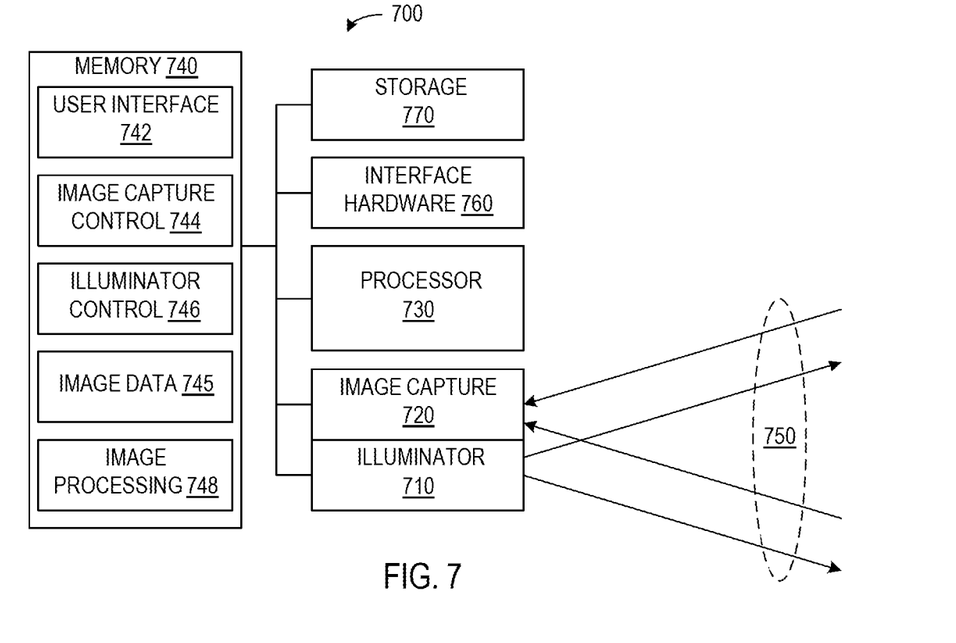
FIG. 7 shows a block diagram of a processing system employing an illuminator providing illumination that is shaped to compensate for characteristics of an image capture system.

FIG. 7 is a block of another implementation of a processing system 700 employing an illuminator 710 that shapes illumination that is directed into a field of view 750 of an image capture system 720. Processing system 700 may be a computer, e.g., a general purpose computing system, or may be a system primarily intended to perform a set of specific functions, e.g., a mobile telephone, tablet, wearable device, or a time-of-flight camera, and the components of processing system 700 may be integrated into a single device, e.g., a portable or handheld device, or may be made up of multiple detachable components, e.g., a computer with one of more peripheral devices. Processing system 700 may specifically include a processor 730 with associated processing hardware that permits processor 730 to access data, e.g., image data 745, and execute instructions, e.g., software or firmware, that may be stored in a memory 740. Processor 730 may, for example, include one or more central processing units (CPUs) or processing cores capable of executing program instructions and may include hardware that enables the CPUs or cores to control operation of connected devices such as illuminator 710 and image capture 720.

Memory 740 may include volatile or nonvolatile random access memory (RAM) that makes up a portion of the address space of processor 730. FIG. 7 illustrates an example implementation in which memory 740 for processor 730 contains a set of executable program modules 742, 744, 746, and 748. (Such modules 742, 744, 746, and 748 may also be stored in or on a storage medium or device 770, which may for example include a hard drive or a removable memory device, instead of or in addition to being in addressable memory.) Modules 742, 744, 746, and 748 may have a variety of purposes and may be selectively executed when system 700 perform specific processes or functions. For example, processor 730 may execute a user interface 742 to control input and output devices in system 700 and to receive commands or information or to provide information or content. In particular, in addition to illuminator 710 and image capture system 720, system 700 includes interface hardware 760, which may include input devices such as switches, buttons, a keypad, a keyboard, a mouse, a touch screen, or a microphone that a user may operate to provide input or commands, and processor 730 may execute user interface 742 to control the input devices and interpret user actions. Interface hardware 760 also may also include conventional output devices such as speakers, an audio system, or a touch screen or other display, and processor 730 may execute user interface 742 to output information via the output devices. Interface hardware 760 may further include network interfaces that enable system 700 to receive or transmit information through a network such as a local area network, a wide area network, a telecommunication network, or the Internet.

Processor 730 may execute image capture control module 744 when using image capture system 720 to capture data, for example, in response to a command to capture an image with image capture system 720 or a command to change the settings, e.g., focus, aperture, filter, or lens, used in image capture system 720. In accordance with an aspect disclosed herein, when image capture is initiated, illuminator 710 produces illumination that is shaped to compensate for limitations of image capture system 720, for example, to reduce vignetting in captured image data. In system 700, processor 730 may execute illuminator control module 746 to control when and how illuminator 710 operates. The particular illuminator control process will generally depend on the capabilities of illuminator 710. For example, if illuminator 710 provides illumination with one fixed shape, one illumination control process may operate illuminator 710 in synchronization with image capture 720, e.g., at the same time as image capture or at a specified time offset relative to image capture. If illuminator 710 can produce illumination with a programmable shape, e.g., if illuminator 710 is similar or identical to illuminator 600 of FIG. 6, processor 730 may execute illuminator control process 746 to select and produce a desired shape for the illumination from illuminator 710. In one such implementation, execution of illuminator control module 746 may identify a target illumination based on the current settings of image capture system 720, i.e., based on the focus, aperture, filter, or other features currently being used image capture system 720. The process resulting from execution of illuminator control module 746 may further detect ambient lighting in field of view 750 and may operate illuminator 710 to direct illumination into field of view 750 that alone or in combination with the ambient lighting achieves the identified target illumination for field of view 750. With fixed illumination or with programmable illumination, the captured image data may have a more uniform SNR than would be achieved with the ambient lighting or with conventional flash or lighting systems.

Image data 745 in memory 740 (or storage 770) may represent one or more images or frames captured by system 700. System 700 in addition to capturing image data 745 may process the image data. In particular, processor 730 may execute image processing module 748 to perform a processing function such as recognizing objects represented in image data 745, extracting depth or distance information for objects represented in image data 745, doing color corrections of image data 745, or performing spectral analysis if image data 745.

Systems and methods such as described above may employ shaped illumination to compensate for unwanted effects such as vignetting and may provide image data having a more uniform SNR across an image. Such systems and methods may be particularly useful where the image data may need to be further processed for machine vision, object recognition, 3D modeling, or other purposes. Some applications that may particularly benefit from these capabilities include but are not limited to security cameras, 3D cameras, depth sensing, object recognition, night vision cameras, biometric identification cameras, and biometric sensing cameras.

While particular embodiments or implementations of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed:

1. A system comprising:
   a camera configured to capture images of a scene that extends over a field of view of the camera;
   a lighting system configured to generate illumination to illuminate the field of view of the camera, the illumination having a distribution shaped to have an intensity at a center of the field of view that is lower than an intensity of the illumination at an edge of the field of view; and
   a processor configured to manipulate first image data corresponding to the scene illuminated by the lighting system using second image data corresponding to the scene with ambient lighting.

2. The system of claim 1, wherein image data representing the scene and captured by the camera has a substantially uniform signal-to-noise ratio as a result of the illumination.

3. The system of claim 1, wherein the processor is configured to combine the first image data with the second image data.

4. The system of claim 1, wherein the processor is configured to remove the second image data from the first image data.

5. The system of claim 1, wherein the lighting system comprises:
   a light source; and
   a lens configured to direct a first intensity of light from the light source to a first area of the field of view and configured to direct a second intensity of the light from the light source to a second area of the field of view, the second intensity being greater than the first intensity.

6. The system of claim 5, wherein the lens is configured to alter the illumination from the light source so that the illumination from the lighting system has a rectangular cross-section.

7. The system of claim 5, wherein:
   the light source is configured to produce the light from a source area; and
   the light from the source area comprises spatially non-uniform illumination.

8. The system of claim 7, wherein the light source comprises a plurality of light elements that are distributed over the source area and operated to produce the spatially non-uniform illumination.

9. The system of claim 7, wherein the source area is located in a focal plane of the lens.

10. The system of claim 1, wherein the lighting system is configured to produce rotationally symmetric illumination.

11. The system of claim 1, wherein the lighting system comprises an array of light emitting diodes.

12. The system of claim 11, wherein the lighting system further comprises a diffuser positioned to control divergence of beams from the light emitting diodes.

13. The system of claim 1, wherein the lighting system comprises an array of semiconductor lasers.

14. The system of claim 13, wherein the lighting system further comprises a diffuser positioned to control divergence of beams from the semiconductor lasers.

15. A method comprising:
    positioning a camera to capture images of a scene that extends over a field of view of the camera;
    generating illumination to illuminate the scene, the illumination having a distribution shaped to have an intensity at a center of the field of view that is lower than an intensity of the illumination at an edge of the field of view;
    capturing, with the camera, first image data representing the scene as illuminated with the illumination having the shaped distribution; and
    capturing, with the camera, second image data representing the scene in ambient light without the illumination having the shaped distribution.

16. The method of claim 15, further comprising combining the first image data and the second image data to produce third image data that has a substantially uniform signal-to-noise ratio.

17. The method of claim 15, further comprising subtracting at least a portion of the second image data, representing the scene in ambient light, from the first image data, representing the scene as illuminated with the illumination having the shaped distribution, to produce third image data that has a substantially uniform signal-to-noise ratio.

18. The method of claim 15, wherein the camera is configured to capture the first image data representing the scene as illuminated with the illumination having the shaped distribution based on a characteristic of the illumination.

19. The method of claim 18, wherein the characteristic of the illumination is selected from the group consisting of a polarization, a wavelength, and a frequency.

20. A system comprising:
    a camera configured to capture images of a scene that extends over a field of view of the camera;
    a lighting system configured to generate illumination to illuminate the field of view of the camera, the illumination having a distribution shaped to have an intensity at a center of the field of view that is lower than an intensity of the illumination at an edge of the field of view, the lighting system comprising:
       a light source configured to produce light from a source area, the light from the source area being spatially non-uniform; and
       a lens configured to direct a first intensity of light from the light source to a first area of the field of view and configured to direct a second intensity of the light from the light source to a second area of the field of view, the second intensity being greater than the first intensity; and
    a processor configured to manipulate first image data corresponding to the scene illuminated by the lighting system using second image data corresponding to the scene with ambient lighting.

* * * * *